UNITED STATES PATENT OFFICE.

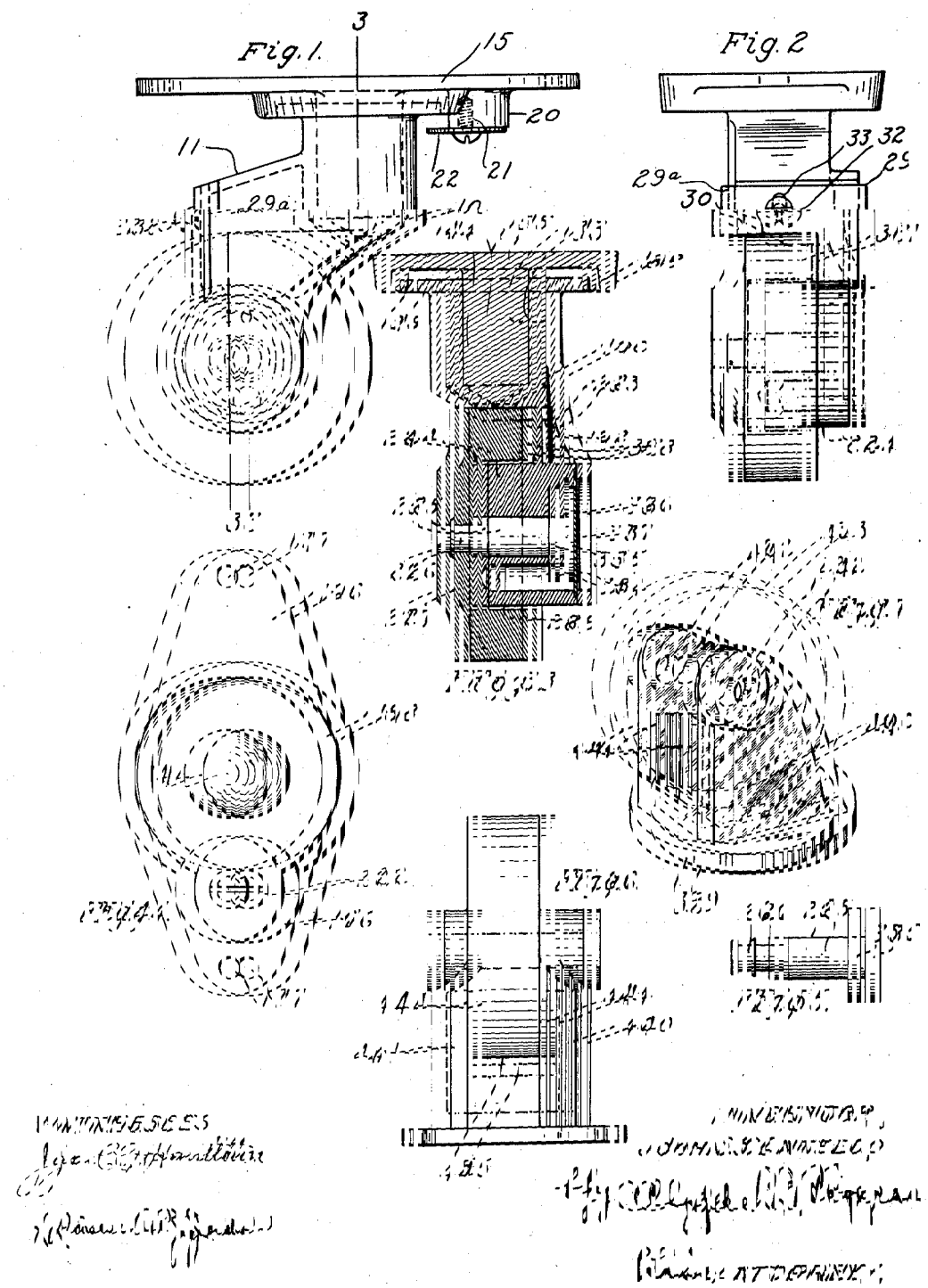

JOHN S. CANTELO, OF BOSTON, MASSACHUSETTS.

CASTER.

1,338,356.  Specification of Letters Patent.  Patented Apr. 27, 1920.

Application filed April 13, 1915, Serial No. 21,125. Renewed September 18, 1919. Serial No. 324,577.

*To all whom it may concern:*

Be it known that I, JOHN S. CANTELO, a citizen of the United States, and resident of Boston, county of Suffolk, Commonwealth of Massachusetts, have invented an Improvement in Casters, of which the following description, in connection with the accompanying drawings, is a specification, like characters on the drawings representing like parts in each of the several views.

This invention relates to casters and while having other and more general fields of usefulness is well adapted for embodiment in a caster for shoe racks such as are used in transporting shoes from one department of a factory to another in the process of manufacture. As a shoe rack is thus moved about in the factory the wheels of its casters are apt to catch particles of thread, cloth, lint and like waste and becomes clogged up, occasioning much annoyance and difficulty in removing the same. This is especially apt to be the case with waxed threads which are commonly found on the floors of the factory. A prime object of the invention is to provide an effective guard device adapted to prevent threads or other waste fibers or particles from winding into the caster wheel or interfering with the rotation thereof. A further object is to provide a simple, reliable oiling means adapted to keep the caster wheel or roller lubricated for a long period without attention. A still further object is to provide a simple, cheaply constructed and strong caster for shoe racks or the like capable of a long period of satisfactory service. The foregoing and other objects and features of the invention will be better understood from the following detailed description taken in connection with the accompanying drawings and will be thereafter pointed out in the appended claims.

Referring to the drawings:

Figure 1 is a side elevation of a caster constructed in accordance with my invention;

Fig. 2 is a front elevation thereof;

Fig. 3 is a vertical section on the broken section line 3—3 of Fig. 1;

Fig. 4 is a bottom plan view of the top holding flange in which the caster is swiveled;

Fig. 5 is a detailed elevation of the pivot pin of the caster wheel;

Fig. 6 is a partial front elevation showing a modified form of the invention; and Fig. 7 is a perspective view of the form shown in Fig. 6.

My improved caster is formed with a bracket frame composed of an upright portion 10 to engage with a swivel connection fixed to the rack or other body to be supported, having a forward offset 11, bearing a depending portion 12 equipped with a bearing for the caster wheel or roller. As shown in Figs. 1 to 4, the upright portion 10 of the frame has a deep cylindrical socket and grease well 13 with a conical bottom to receive a correspondingly shaped hub 14 depending from and as shown integral with a flange plate 15 which may be extended at two sides to form ears 16 having holes 17 therethrough to receive securing devices whereby the caster may be fixed to the shoe rack or other body to be supported. The plate 15 is formed with a circular depending flange 18 and the top of the upright frame portion 10 is provided with a radial plate flange 19, these parts being relatively arranged when the hub 14 is seated in the socket or grease well 13, so that there will be some little space between the flange 19 and the supporting plate thereabove with its shroud flange 18. At one side of the shroud flange 18 a projection 20 is formed on the plate 15, this projection being some little higher than the flange 18, and on this projection is fixed as by a screw or rivet 21, a washer 22 adapted to prevent the hub 14 from being drawn too far out of its socket. By having the washer 22 spaced some little distance away from the flange 19, the hub 14 is permitted to work in and out of the socket and grease well 13 so that the lubricant is kept spread and disseminated to all parts of the swivel bearing. The shroud flange 18 completely protects the swivel joint thus formed and the spacing of the flange 19 away from the adjacent plate 15 and flange 18 provides clearance to apply grease or other lubricant. The depending portion 12 of the bracket frame is not only offset forwardly as seen at 11 but also laterally as indicated at 23, and it has formed thereon a hub 24 which extends back into the transverse central plane of the caster. The hub 24 is centrally bored to receive a bearing pin or shaft 25 which is journaled therein and has a reduced end 26 thereof set into axially and fixed to the wheel or roller 27 of the caster, this wheel being centrally recessed as seen at 28 to receive the hub which extends a substantial distance thereinto. In accordance with my invention a guard device is provided to prevent the wheel or roller taking on or winding in, threads or other waste. For this purpose I show in Figs. 1 and 2 a plate 29 mounted at the front of the forward offset 11 having a portion 30 extending down to engage with, or lie closely adjacent to, the top of the wheel, and another portion 31 extending down to lie alongside and closely adjacent to the side of the wheel where it has interfitting relation with the hub 24. It will be observed that this guard plate extends down substantially above the axis of rotation of the wheel. With this arrangement as the bearing of the wheel may wear to some little extent, it will tend to bring the wheel into closer engagement with the guard member, so that so long as the caster is serviceable it is insured that the guard member will be effective for preventing the passage of threads or the like past it on the periphery of the wheel. To further insure the correct adjustment of the guard device into operative relation with the wheel periphery I show it fixed to the frame by a screw 32 which passes through an elongated slot 33 of the guard or scraper so that the guard may be set in to just the right point and securely clamped in place. The plate 29 may be bent at its edge as seen at 29ª to engage the frame for locating the guard properly and holding it from displacement.

It is usually the case that casters of this kind are given practically no attention after once being put in use, and hence it is important that an adequate means of lubrication that will keep the caster lubricated for a long period be provided. For this purpose I provide a reservoir for lubricant in the hub 24, by forming one or more bores in said hub, one such bore being shown at 34. The bearing pin or shaft 25 which is fixed to rotate with the wheel has at its inner end a radial flange 35 of a dimension adapted to pass through the bore 34 so that when said bore contains lubricant it will be carried up by said flange and disseminated through the bearing. The hub is also shown as formed with an enlarged recess 36 opening to the flange 35 which may also serve as a lubricant container. This recess is closed by a cap 37 which may be set into a shallow shoulder formed in the face of the hub. It is to be observed that while the guard or scraper member fits the periphery of the wheel closely, the bracket frame is elsewhere formed with clearance so as to permit the freest possible rotation of said wheel, this clearance being indicated at 38. In Figs. 6 and 7 I show a form of the invention wherein the guard member instead of being formed as a separate plate is integral with the bracket frame which in this case is shown as formed with cheek pieces at each side of the roller instead of with an offset portion only at one side thereof as in the first described form. In this form the bracket frame is equipped with a disk flange portion 39 adapted to constitute one member of a swivel connection with the rack, from which depend spaced apart parallel cheek pieces 40, 41, having at their lower ends forwardly offset bearings 42 for the caster wheel or roller 43. The cheek pieces 40, 41 are in this form provided with shear edges 44 which extend up closely against the sides of the wheel from its periphery to its axis joint, while a similar shear edge 45 extends in from the frame closely against the periphery of the wheel, it being noted that this shear edge which engages the periphery, is as in the first described form substantially above the bearings 42, so that as the wheel bearing may wear, the wheel is kept closely against the guard thus provided. I am aware that the invention may be embodied in other specific forms as to the various details of construction herein exhibited, and I therefore desire the present embodiment to be considered as illustrative and not restrictive, reference being made to the appended claims to indicate the scope of the invention.

Having described my invention, what I claim as new and desire to secure by Letters Patent is:

1. A caster, comprising a frame, a wheel pivoted thereto, and a guard structure on said frame arranged closely adjacent said wheel both peripherally and laterally thereof to prevent winding of threads thereon, the lateral portions of said guard terminating above the wheel pivot and permitting the guard structure as a whole to be self-adjusting downward to take up for wear.

2. A caster, comprising a frame, having a depending leg with a hub formed thereon, and a wheel journaled to said hub, said hub having a lubricant container formed therein, and said wheel having means movable therewith for distributing the lubricant.

3. A caster, comprising a frame, having a depending leg with a hub formed thereon, a wheel journaled to said hub, said hub having a lubricant container formed therein, and said wheel having a plate flange mounted to rotate into said lubricant container to distribute lubricant.

4. A caster, comprising a frame having a depending leg with a hub formed thereon, and a wheel having an axle fixed thereto extending into and journaled in said hub said hub extending into a recess seat therefor in said wheel, said wheel being supported wholly by said axle at one side of the hub.

5. A caster, comprising a frame, having a depending leg with a hub formed thereon, a wheel recessed to fit over said hub, and an axle fixed to said wheel extending at one side thereof only and journaled in said hub, said hub having a lubricant container bore and said axle having a plate flange extending into said container to distribute the lubricant.

6. A caster, comprising a frame, having a depending leg with a hub formed thereon, and a wheel having an axle fixed thereto extending at one side thereof only and journaled in said hub, said hub extending into a recess seat therefor in said wheel, said hub having provision to completely incase said axle for the purpose stated.

7. A caster, comprising a frame, having a wheel journaled thereto, said frame being formed with a swivel socket and grease well at the top thereof, and a supporting member formed with a depending hub fitted to said socket, said supporting member and hub having provision to permit limited sliding movement with respect to said socket.

8. A caster, comprising a frame, having a wheel journaled thereto, said frame having at its top a swivel socket and grease well, said socket having a radial top plate flange, and a supporting member having an integral hub fitted to said socket with provision for limited in-and-out sliding movement, said supporting member having a shroud flange depending therefrom surrounding said radial plate flange.

9. A caster, comprising a frame, having a wheel pivoted thereto, said frame having at its top a swivel socket equipped with a radial top plate flange, and a supporting member having a hub integral therewith fitted to said socket, said frame having a downward projection with a stop mounted thereon in position to engage said radial flange to permit limited in-and-out sliding movement of said hub for the purpose stated.

In testimony whereof, I have signed my name to the specification, in the presence of two subscribing witnesses.

JOHN S. CANTELO.

Witnesses:
LOUISE A. JORDAN,
CLYDE L. ROGERS.